United States Patent Office 3,503,792
Patented Mar. 31, 1970

3,503,792
METHOD OF PREVENTING THE RAPID OXI-DATION OF REFRACTORY ALLOYS IN HIGH - TEMPERATURE, LOW - PRESSURE OXIDIZING ENVIRONMENTS
Willi A. Baginski, Bellevue, Carol A. Krier, Renton, and Richard E. Regan, Bellevue, Wash., assignors to The Boeing Company, Seattle, Wash., a corporation of Delaware
No Drawing. Filed June 23, 1966, Ser. No. 559,731
Int. Cl. B44d *1/094;* C23c *11/06*
U.S. Cl. 117—135.1                                            6 Claims

ABSTRACT OF THE DISCLOSURE

A method for preventing the rapid oxidization of refractory metal alloys when exposed to high temperature and reduced pressure environments comprising coating the refractory metal alloys with a modified disilicide alloy consisting essentially of a first component selected from the group of columbium, molybdenum, tantalum and tungsten; a second component of silicon; a third component selected from the group consisting of titanium, tantalum, and vanadium; and a fourth component selected from the group consisting of boron, hafnium and aluminum.

---

This invention relates to silicon base diffusion coatings for refractory metals. More specifically, this invention relates to silicide base diffusion coatings and silicide base alloys consisting essentially of (M)Si$_2$, where M is a refractory metal substrate modified by certain alloying additions, which, in accordance with this invention, provide resistance to high temperature oxidation at both high-pressure and low-pressure environments.

Considerable development work has been performed on the refractory disilicides with the intent to develop refractory metal coatings having improved oxidation life and maximum strength at high temperatures. There is a continuing and urgent need for materials which are resistant to oxidation in the severe environmental conditions encountered in aero-space and nuclear applications. Such applications will not only impose high temperature upon materials but will also provide the added inducement to oxidation of low pressures. These materials are required for fabrication of hardware consisting of either solid bodies or composite materials such as coated refractory metals.

The problem of protecting the refractory metals, such as columbium, tantalum, molybdenum, tungsten and their alloys from oxidation in high temperature environments has been and continues to be a most difficult one. Research and development effort has been expended on this problem for about 20 years, and progress has been made slowly toward solutions to the problem.

In general, the progress has been made through using silicide base materials as coatings, such as columbium disilicide, CbSi$_2$, tantalum disilicide, TaSi$_2$, molybdenum disilicide, MoSi$_2$, and tungsten disilicide, WSi$_2$. A critical shortcoming common to all of these coatings in high temperature, reduced oxygen pressure environments is their rapid deterioration due to physical and chemical vaporization processes which renders them incapable of performing the metal protection function for which they were applied and which must be accomplished for successful application.

This invention greatly reduces the rate of oxidation of silicide-type materials and provides for reliable use of them in high temperature and reduced pressure environments such as those encountered by a space vehicle on re-entry into an atmospheric environment from a mission. In such an environment, refractory metals, such as columbium, tantalum, molybdenum, tungsten, and their alloys must be used for various components because they alone possess the physical and mechanical properties necessary to withstand temperatures exceeding 2000 degrees Fahrenheit. In an unprotected condition, none of these refractory metals possess the oxidation resistance to survive an oxidizing atmosphere for more than a few moments at such high temperatures. Silicide base diffusion coatings have provided an answer to this problem.

The silicide base diffusion coatings provide protection to the substrate refractory metal because they are capable of forming a tenacious "passive" SiO$_2$ film which resists further oxidation. The coating remains protective so long as a layer of (M)Si$_2$ remains. The coating fails by silicon depletion from the surface as by silicon diffusion into the substrate. Under conditions of high temperature and reduced pressures the stable SiO$_2$ film does not form; instead, a volatile SiO film develops. The SiO film, being volatile, is termed "active"; i.e., the film leaves the surface of the substrate and eventually no effective protection remains. This invention is specifically developed to impede the reaction:

$$(M)Si_2 + O_2 \rightarrow SiO$$

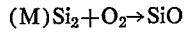

or to reduce the fugacity of any SiO film that does form.

According to the teachings of the present invention, it will be shown that when relatively small additions of some of the group IV, V or VI transition metals are made to the refractory metal silicides, the reduced pressure oxidation resistance of the silicides is substantially improved. Additions of the aforenamed transition metals according to the teachings of this invention, while being especially beneficial in increasing resistance to low-pressure oxidation, also permits retention of the inherent oxidation resistance of the refractory metal silicide at atmospheric pressures.

Accordingly, it is an object of the present invention to provide refractory metal coatings which are capable of withstanding any deterioration at atmospheric and low pressure oxidizing conditions.

Another object of the instant invention is to provide a coated refractory metal having thermal shock resistance, mechanical shock resistance and the ability to withstand such severe thermal and mechanical stresses in a reduced pressure environment.

A further object of this invention is to provide alloys having high oxidation resistance when subjected to high temperature and low pressure oxidizing environments.

According to the teachings of this invention, by a modification of the basic composition of several refractory metal silicides by the addition of one or more of several elements, the oxidation performance at reduced pressures can be substantially improved and the oxidation performance at atmospheric pressure maintained or improved.

Modifications of refractory metal silicides according to the teachings of this invention are as follows:

EXAMPLE 1

This example discloses improvements, according to our newly-discovered modification and improved coating system, on columbium alloys. The improvement of a disilicide coated columbium alloy such as C–129Y using vanadium as a modifier is as follows: A C–129Y (columbium-10% tungsten-10% hafnium) sheet was triple coated by cementation in a fluidized bed in accordance with U.S. patent application S.N. 147,004, filed Oct. 23, 1961, and entitled "Metal Diffusion Coating Utilizing Fluidized Bed," now U.S. Patent No. 3,249,462. The first bed contained silicon metal powder, the second bed contained vanadium metal powder and the third contained silicon metal powder. The coating temperature was maintained between 1800 and 1950° F. and fluidization carried out in an inert atmosphere. Iodine vapor was introduced to the fluidization process to promote the vanadizing and siliconizing reactions.

The resulting coated specimens contained a coating which consisted of: 41.7 to 47.0 weight percent Cb, 39.8 to 40.7 weight percent Si, 8.0 to 14.0 weight percent V, 2.3 to 2.6 weight percent W and 2.3 to 2.6 weight percent Hf, as the nominal composition.

Oxidation studies performed on bulk disilicides showed the ideal composition range to be 8–14 weight percent vanadium.

Specimens of C–129Y alloy sheet were coated as described above and statically oxidation tested at 2800° to 3000° F. at atmospheric pressure and at moderately reduced pressures. Specimens were dynamically oxidation tested in accordance with a typical re-entry profile. Additionally, other C–129Y alloy sheet specimens were coated with an unmodified silicide coating and tested in a similar manner. The results, tabulated below, serve to illustrate the desirability and utility of the disclosed invention. Not only was the reduced pressure oxidation resistance substantially improved but the atmospheric pressure performance was significantly improved as well.

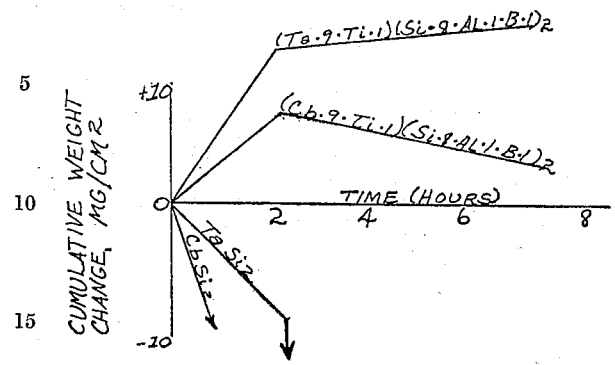

GRAPH 1

EXAMPLE 3

Samples containing 56.2 to 58.2 weight percent Cb, 30.3 to 34.5 weight percent Si, 3.9 to 7.1 weight percent Al, 2.4 to 4.4 weight percent Ti and 1.0 to 2.0 weight percent

TABLE I

| Test | Pressure | Max. Temp. | Mean Service Life (Number of one hour cycles to failure) |
|---|---|---|---|
| Standard Unmodified Disilicide C–129Y Alloy: | | | |
| Static oxidation test | 1 atm | 2,600° F | 25. |
| Dynamic low pressure oxidation test | Variable [1] | 2,600° F. [1] | 3. |
| Re-entry simulation oxidation test | Variable [2] | 3,000° F. [2] | Fails to reach 3,000° F. |
| Vanadium-modified Disilicide Coated C–129Y Alloy: | | | |
| Static oxidation test | 1 atm | 2,600° F | 80. |
| Dynamic low pressure oxidation test | Variable [1] | 2,600° F. [1] | 25. |
| Re-entry simulation oxidation test | Variable [2] | 3,000° F. [2] | Successfully completes cycle. |

[1] Test performed in a furnace with a stepwise change in temperature and pressure ranging from 2600°–2100° F. and 0.1–15 torr respectively.

[2] Test performed in apparatus which simulated re-entry conditions of an article passing from space into an atmosphere. Temperature and pressure were varied during a one hour cycle from 1,900–3,000–1,900° F. and 0.1 to 50 torr respectively.

Although the coatings prepared for this example were produced by fluidized bed cementation, they could just as easily have been prepared by, for instance, the pack cementation process which is well developed for refractory metal coatings.

In the following examples, no coatings of refractory metals are involved. Instead, alloys in bulk form are described which will perform under static oxidation conditions as well as the disilicide coated metals.

EXAMPLE 2

This example demonstrates that the oxidation performance of tantalum disilicide ($TaSi_2$) can be substantially improved by the addition of titanium (Ti), aluminum (Al) and boron (B). Samples containing 70.8 to 72.2 weight percent Ta, 20.6 to 23.1 weight percent Si, 2.5 to 4.5 weight percent Al, 1.5 to 2.9 weight percent Ti and 0.7 to 1.2 weight percent B were prepared in bulk form as by arc casting methods well known in the art and statically oxidation tested at atmospheric pressure and at 0.5 torr pressure and 2800–2900° F. The modified bulk material corresponding to the stoichiometry $$(Ta_{.9}Ti_{.1})(Si_{.8}Al_{.1}B_{.1})_2$$

showed vastly superior oxidation resistance when compared with the unmodified tantalum disilicide ($TaSi_2$) as seen below with reference to Graph 1. This modified tantalum disilicide alloy can be coated to tantalum alloy substrates by multiple step fluidized bed or pack cementation.

B were prepared in bulk form and oxidation tested both at atmospheric pressure and 2900° F. and at 0.5 torr and 2800° F. This composition which corresponds to the stoichiometry $(Cb_{.9}Ti_{.1})(Si_{.8}Al_{.1}B_{.1})_2$ showed better oxidation resistance when compared to the unmodified columbium disilicide ($CbSi_2$), as seen with reference to Graph 1.

This modified columbium disilicide alloy can be coated onto columbium alloy substrates.

EXAMPLE 4

The low pressure oxidation performance of molybdenum disilicide ($MoSi_2$) was improved by the addition of boron and titanium.

Example 1 demonstrated the ability to introduce a modifying element (vanadium) to a disilicide surface coating by a multiple cementation process in the fluidized bed. The chemical similarity between Ta and Ti and vanadium are indicative that they can also be applied in the same or similar manner. (Titanium is presently being introduced in commercial coatings.) Experiments have demonstrated the ease of boronizing these metals by the pack cementation processes or in the fluidized bed.

Samples containing: 58.0 to 60.5 weight percent Mo, 34.9 to 35.9 weight percent Si, 2.5 to 5.0 weight percent Ti and 1.0 to 2.0 weight percent B, and corresponding to a stoichiometry of $(Mo_{.9}Ti_{.1})(Si_{.9}B_{.1})_2$, were prepared and oxidation tested and compared with the oxidation resistance of unmodified molybdenum disilicide ($MoSi_2$) at atmospheric pressure and at 0.5 torr. The results depicted in Graph 2, demonstrate clearly the beneficial effect of the additives.

GRAPH 2

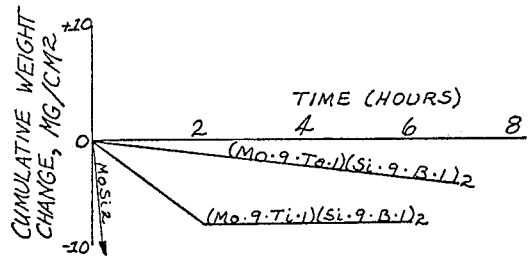

EXAMPLE 5

Samples containing 51.7 to 57.3 weight percent Mo, 31.9 to 32.9 percent Si, 8.8 to 14.6 weight percent Ta and 0.9 to 1.8 weight percent B were prepared in bulk form and oxidation tested at: (1) 2900° F. and atmospheric pressure and (2) 2800° F. and 0.5 torr pressure. The composition, corresponding to the stoichiometry.

$$(Mo_{.9}Ta_{.1})(Si_{.9}B_{.1})_2$$

showed a low pressure oxidation performance vastly superior to that of the simple molybdenum disilicide ($MoSi_2$) as illustrated in Graph 2.

EXAMPLE 6

Samples of unmodified tungsten disilicide prepared in bulk form were produced and the oxidation resistance compared with samples containing 72.5 to 76.0 weight percent W, 22.5 to 24.5 weight percent Si and 1.5 to 3.0 weight percent vanadium by oxidation testing in air at 2800–2900° F. at reduced pressures of 0.5 torr and atmospheric pressure.

GRAPH 3

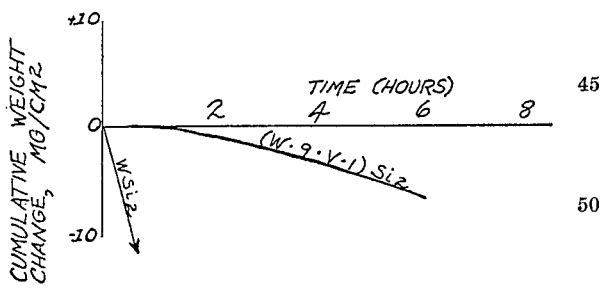

The results, presented in Graph 3, show the superiority of the vanadium modified tungsten disilicide, at reduced pressures, over the simple tungsten disilicide ($WSi_2$).

These examples clearly show that, according to our invention, the oxidation resistance of the refractory metal disilicides, at low pressures, was substantially improved when properly modified. As shown previously, in the test results of Table I and depicted in Graphs 1, 2 and 3, the usual linear oxidation rate associated with "active" oxidation of the refractory metal silicides in high temperature-low pressure environments is replaced by a highly desirable exponential rate; i.e., the oxidation rate is remarkably low for long periods of time at high temperatures and low pressures.

In general, our new oxidation resistance coatings comprise an alloy of a substrate metal silicide (columbium, molybdenum, tantalum, tungsten or their alloys) in combination with varying proportions of one or more of the following elements, Al, B, Ta, Ti and V. This alloy more specifically consists of 45 to 76 weight percent of at least one metal selected from the group consisting of columbium, molybdenum, tantalum and tungsten; from 20 to 42 weight percent of silicon; from 2 to 15 weight percent of one or more metals selected from the group consisting of titanium, tantalum and vanadium; from 0 to 7.5 weight percent of one or more metals selected from the group consisting of boron, hafnium and aluminum.

We claim:
1. The method of preventing the rapid oxidization of a columbium based alloy substrate in a high temperature and a reduced oxygen pressure environment comprising the steps of:
   (a) preparing a modified columbium disilicide alloy consisting essentially of
      41.7 to 47.0 weight percent columbium,
      39.8 to 40.7 weight percent silicon,
      8.0 to 14.0 weight percent vanadium,
      2.3 to 2.6 weight percent tungsten,
      2.3 to 2.6 weight percent hafnium; and
   (b) applying said modified columbium disilicide alloy to the columbium based alloy substrate to form a protective coating thereon.

2. The method of preventing the rapid oxidization of a tantalum based alloy substrate in a high temperature and a reduced oxygen pressure environment comprising the steps of:
   (a) preparing a modified tantalum disilicide alloy consisting essentially of
      70.8 to 72.2 weight percent tantalum,
      20.6 to 23.1 weight percent silicon,
      2.5 to 4.5 weight percent aluminum,
      1.5 to 2.9 weight percent titanium,
      0.7 to 1.2 weight percent boron; and
   (b) applying said modified tantalum disilicide alloy to the tantalum based alloy substrate to form a protective coating thereon.

3. The method of preventing the rapid oxidization of a columbium based alloy substrate in a high temperature and a reduced oxygen pressure environment comprising the steps of:
   (a) preparing a modified columbium disilicide alloy consisting essentially of
      56.2 to 58.2 weight percent columbium,
      30.3 to 34.5 weight percent silicon,
      3.9 to 7.1 weight percent aluminum,
      2.4 to 4.4 weight percent titanium,
      1.0 to 2.0 weight percent boron; and
   (b) applying said modified columbium disilicide alloy to the columbium based alloy substrate to form a protective coating thereon.

4. The method of preventing the rapid oxidization of a molybdenum based alloy substrate in a high temperature and a reduced oxygen pressure environment comprising the steps of:
   (a) preparing a modified molybdenum disilicide alloy consisting essentially of
      58.0 to 60.5 weight percent molybdenum,
      34.9 to 35.9 weight percent silicon,
      2.5 to 5.0 weight percent titanium,
      1.0 to 2.0 weight percent boron; and
   (b) applying said modified molybdenum disilicide alloy to the molybdenum based alloy substrate to form a protective coating thereon.

5. The method of preventing the rapid oxidization of a molybdenum based alloy substrate in a high temperature and a reduced oxygen pressure environment comprising the steps of:
   (a) preparing a modified molybdenum disilicide alloy consisting essentially of
      51.7 to 57.3 weight percent molybdenum,
      31.9 to 32.9 weight percent silicon,
      8.8 to 14.6 weight percent tantalum,
      0.9 to 1.8 weight percent boron; and
   (b) applying said modified molybdenum disilicide alloy to the molybdenum based alloy substrate to form a protective coating thereon.

6. The method of preventing the rapid oxidization of a tungsten based alloy substrate in a high temperature and a reduced pressure environment comprising the steps of:
  (a) preparing a modified tungsten disilicide alloy consisting essentially of
    72.5 to 76.0 weight percent tungsten,
    22.5 to 24.5 weight percent silicon,
    1.5 to 3.0 weight percent vanadium; and
  (b) applying said modified tungsten disilicide alloy to the tungsten based alloy substrate to form a protective coating thereon.

References Cited

UNITED STATES PATENTS

| | | | |
|---|---|---|---|
| 1,774,849 | 9/1930 | Schroter | 75—176 |
| 1,820,966 | 9/1931 | Donaldson et al. | 75—176 |
| 2,939,785 | 6/1960 | Weatherly et al. | 75—134 |
| 3,249,462 | 5/1966 | Jung et al. | 117—71 |

RICHARD O. DEAN, Primary Examiner

U.S. Cl. X.R.

75—174, 176